O. W. HANSON.
PISTON.
APPLICATION FILED OCT. 27, 1920.
1,426,072.
Patented Aug. 15, 1922.
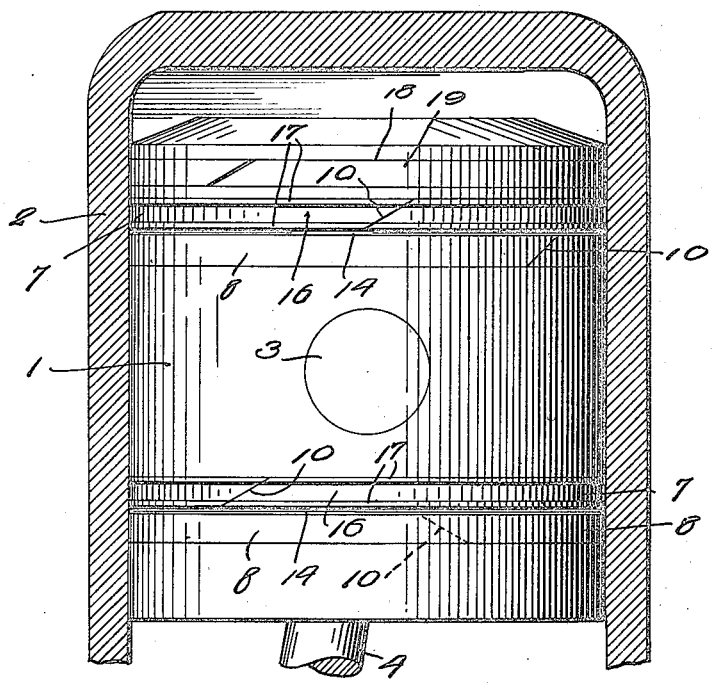
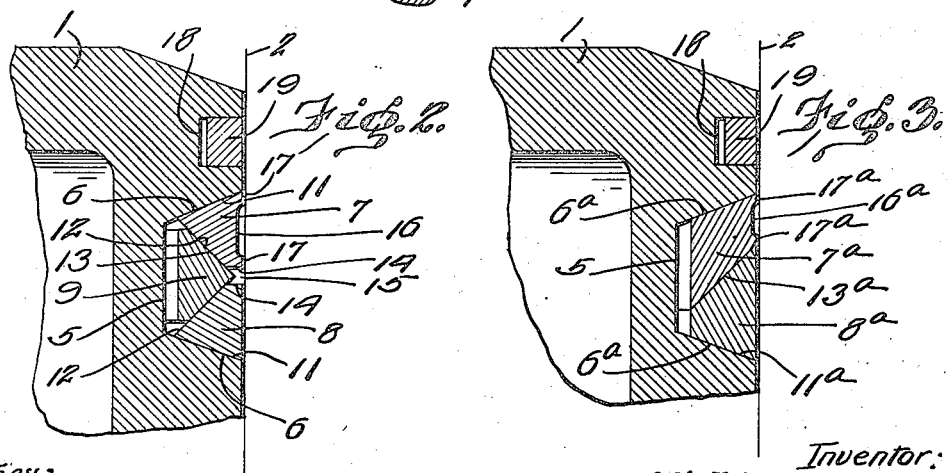
Witness:
Inventor:
Oscar W. Hanson,
By C. C. Hines,
atty.

UNITED STATES PATENT OFFICE.

OSCAR W. HANSON, OF SALINA, KANSAS.

PISTON.

1,426,072.  Specification of Letters Patent.  Patented Aug. 15, 1922.

Application filed October 27, 1920. Serial No. 419,902.

*To all whom it may concern:*

Be it known that I, OSCAR W. HANSON, a citizen of the United States, residing at Salina, in the county of Saline and State of Kansas, have invented new and useful Improvements in Pistons, of which the following is a specification.

This invention relates to improvements in engine pistons and piston packings, and has particular reference to pistons for internal combustion engines.

The primary object of the invention is to provide a piston having guiding means for ensuring its movement in a substantially direct line in the cylinder, thus preventing or reducing to a material extent what is commonly known as "piston slap" and the extra wear and tear on the cylinder wall caused thereby.

Another object of the invention is to provide guiding means in the form of spring packing rings arranged on opposite sides of the wrist pin point of the piston and operating to mutually oppose and counteract undue pivotal motion of the piston on said wrist pin, said packing rings also serving as efficient packing elements and having a quick seating action to rapidly conform to variations in the surface of the cylinder wall to effect a tight seal against leakage of oil or gases.

The invention consists of the features of construction, combination and arrangement of parts, hereinafter fully described and claimed, reference being had to the accompanying drawing, in which:

Figure 1 is a view in elevation of a piston and piston packing embodying my invention, showing the same arranged within an engine cylinder, the latter appearing in section.

Figure 2 is an enlarged longitudinal section through the piston and cross-section through one of the packing rings.

Figure 3 is a view similar to Figure 2, showing a modification in the packing ring construction.

Referring now more particularly to the drawing, 1 designates a piston of generally conventional construction, movable within the cylinder 2, and coupled in the usual manner with the crank shaft of the engine through the medium of the wrist pin 3 and connecting rod 4.

In accordance with my invention, the piston 1 is provided with a pair of packing grooves 5 extending circumferentially thereof, and arranged equidistantly between the wrist pin 3 and the opposite ends of said piston, within which packing grooves are arranged guiding and packing rings of novel construction and arrangement, which I will now proceed to describe.

In the form of my invention illustrated in Figures 1 and 2, each groove 5 is shown as provided with inclined or beveled side walls 6 inclined at a gentle angle, namely, an angle of about 20° with respect to the bottom wall of the groove and longitudinal axis of the piston. Arranged within the groove 5, for cooperation with said walls, is a sectional guiding and packing ring comprising three ring sections 7, 8 and 9. Each of these ring sections is made of suitable elastic or spring metal and is of the split ring type, the ends thereof being preferably separated at an oblique angle, as indicated at 10, for an overlapping engagement with each other. The respective ring sections are of proper diameter to fit within the groove 5 and are contracted slightly before being applied within the groove, so that said ring sections are placed under tension and are adapted to spread and expand in an outward direction. The ring sections 7 and 8 are arranged on opposite sides of the central line of the groove, and on opposite sides of the intermediate ring section 9, and are adapted to have their outer peripheries come in contact with and conform to the contour of the interior surface of the cylinder for a guiding and packing action, as hereinafter fully described.

The two sets of sectional rings are designed, by their prescribed arrangement on opposite sides of the transverse center of the piston, to engage the cylinder walls equidistantly beyond the transverse line of the wrist pin 3 and to thereby serve as guiding elements to guide the piston in its reciprocations substantially in a straight line. These sectional rings or guiding elements are thus so disposed as to maintain contact with the walls of the cylinder, between the ends of the piston and the pivotal connection between the piston and the connecting rod 4, so that each sectional ring establishes a substantial resistance to displacement of the piston from a direct line of movement coaxially with the cylinder, thus preventing or reducing to a minimum pivotal motion of the piston on its wrist pin. It will be observed that this resistance to pivotal motion of the piston is of a yielding character, thus avoiding any tendency to stiffness of motion between the wrist pin and connecting rod, while at the same time entirely eliminating or reducing to a highly material degree pivotal play of the piston producing what is commonly known as piston slap. By this means the wear and tear on the interior surface of the cylinder along certain lines is prevented or reduced, the internal shape of the cylinder preserved, and wear and tear upon all the parts reduced, with other attendant advantages.

The ring sections 7 and 8 are in general duplicates in construction, each having an outer beveled side wall 11 arranged for sliding contact with the adjacent wall 6 of the groove and extending at the same angle thereto, and an inner beveled surface 12 for cooperation with the intermediate ring section 9. This intermediate ring section 9 is substantially of triangular form in cross section, having beveled side walls 13 for engagement with the inner surfaces 12 of the ring sections 7 and 8. The surfaces 12 and 13 are beveled or inclined at an angle somewhat greater than the angle of the surfaces 6 and 11, said surface 12 and 13 being preferably arranged at an angle from 30° to 45° with relation to the bottom wall of the groove and the longitudinal axis of the piston. The inclined surfaces 12 terminate in rear of the peripheral surfaces of the ring sections 7 and 8, leaving short straight surfaces 14 which are disposed in parallel relation and provide an intervening annular space or slot 15 to receive the apex portion of the intermediate ring section 13 and to form an annular oil channel between the adjacent ring surfaces. This channel is filled with oil in the operation of the piston, the body of the oil sealing the joint between the ring sections and furnishing a store of oil to keep all the coacting wear surfaces constantly lubricated.

The outer peripheral surfaces of the ring sections 7 and 8 contact directly with the wall of the cylinder and act as guiding and packing surfaces, as will be readily understood. Whenever any looseness, due to wear, occurs these ring sections 7 and 8 are forced outward by the wedging action of the intermediate ring section 13, which supplements the spring action of the ring sections 7 and 8 in this respect. In forcing the ring sections 7 and 8 outwardly, the ring section 13 also tends to spread said ring sections 7 and 8 apart, thus keeping their inclined surfaces 11 in contact with the inclined surfaces 6 of the piston groove so as to constantly seal the joints at these points and pack the piston groove against leakage of oil and gases. Owing to the fact that the inclination of the surfaces 6 and 11 is less than the inclination of the surfaces 12 and 13, it will be evident that, while the pressure of the section 9 tends to spread the sections 7 and 8, it also tends to force said sections 7 and 8 in a substantially direct line outward, thus at all times maintaining the packing action of the ring sections within the piston groove while limiting the amount of the spreading action of the sections 7 and 8 to a material extent, whereby at all times the bearing distance between the ring sections 7 and 8 on the wall of the cylinder is substantially preserved. By this means a rapid and efficient adjustment of the ring sections 7 and 8 to compensate for wear is secured, while the bearing and guiding action of said ring sections on the wall of the cylinder is at all times maintained substantially constant and the integrity of the packing unit preserved to obviate or diminish to a material extent any liability of the component parts having independent play tending to increase friction or wear or cause a binding action.

By the described arrangement of the sets of packing units the piston will be effectually guided in a substantially straight path to prevent piston slap in an obvious manner. By also having the surfaces of the ring sections inclined as set forth the tendency of the ring sections to tilt or cant in a lateral direction on the reverse movements of the piston will be effectually resisted. It will be evident that the tendency to tilting motion in one direction of the ring sections 7 and 8 will be overcome by contact of the surfaces 6 and 11, and the still greater tendency of tilting motion of said sections 7 and 8 in the reverse direction will be overcome by contact of the surfaces 12 and 13, and that when the tendency to tilting motion in this direction is comparatively great this will be yieldingly resisted by the spring action of the intermediate ring section 9, thus allowing a limited recession of the ring sections 7 and 8 to avoid liability of injury to said ring sections or undue wear upon the contact surfaces of said ring sections and the cylinder. It will be understood, of course, that by having the walls of the groove beveled the rings can not move inward without their beveled inner surfaces riding on one another and opposing a spring resistance to the recession of the ring sections as a whole, whereby a cushioning action is afforded, this being particularly desirable in overcoming piston slap.

The peripheral surface of one of the ring sections 7 or 8 is preferably cut away to provide an annular channel or recess 16 bounded by annular ribs or contact points 17. These annular ribs or contact points 17 provide reduced surfaces for wear upon the channeled ring section, allowing said ring section to wear away more rapidly than its companion ring section, with the result that such quick wearing ring section will provide for a rapid adjustment of the packing rings to compensate for wear and a rapid seating of the channeled ring section against the face of the cylinder to conform to the shape thereof. The channel 16 further provides a supplemental oil recess for retaining an additional supply of oil to lubricate the surfaces and particularly the quick wearing ribs, preventing such ribs from being too quickly worn away or from too rapidly wearing the surface of the cylinder. By this construction, in conjunction with the features heretofore described, a packing is produced which is not only efficient to prevent leakage of oil or gases, but also readily adjustable to keep the piston groove packed, quick seating to conform to the shape of the cylinder, and of a yielding character to cushion the piston in its tendency to pivotal movements, thus overcoming piston slap without objectionable strains or wear and tear upon the wrist pin and connecting rod.

While I preferably employ a three-piece ring of the construction and for the purpose described, the same result may, to a large extent, be obtained under some conditions with a two-piece ring of the construction shown, for example, in Figure 3. In this construction the piston groove 5 is of the form previously described, and the two ring sections 7ª and 8ª have their outer surfaces 11ª beveled at an angle of about 20° to conform to the bevel of the side walls 6ª of the groove, but the relatively inner face 13ª of said ring sections 7ª and 8ª are beveled at a much sharper angle, preferably at an angle of from 30° to 45°. By this construction the ring sections are adapted to maintain contact with each other and the walls 6ª as they move outward, while the surfaces 13ª oppose a resistance to tilting motion of the ring sections and also to inward movement thereof, while affording a cushioning action on the degree of inward movement permitted thereby. The line of division between the two ring sections also makes the ring section 7ª relatively restricted in breadth at its contact portion for an efficient rapid wear and seating action. This ring section 7ª is provided with a channel 16ª and rapid wear ribs 17ª corresponding to the channel 16 and ribs 17 of the ring section 7 shown in Figures 1 and 2, whereby the ring structure illustrated in Figure 3 is adapted to provide for a quick adjustment of the rings to the surface of the cylinder and their quick seating action thereon.

I may, if desired, provide the top of the cylinder with an annular groove 18 to receive a split spring packing ring 19 of conventional construction, to assist in preventing leakage at the point where leakage most commonly occurs and to promote the general efficiency of the packing by relieving the guiding rings of a portion of the pressures which would otherwise fall thereon.

Having thus fully described my invention, I claim:

1. The combination of a cylinder, a piston operating therein, a connecting rod having pivotal connection with the piston, said piston being provided with grooves on opposite sides of said pivotal connection, said grooves having gently inclined side walls, and a packing arranged in each of said grooves and comprising a plurality of split resilient packing rings having outer inclined surfaces conforming to and bearing against the inclined side walls of the grooves and having inner inclined surfaces arranged at a greater angle than said outer inclined surfaces and the said inclined surfaces of the side walls.

2. The combination of a cylinder, a piston operating therein, a connecting rod having pivotal connection with the piston, said piston having annular grooves on opposite sides of said pivotal connection, said grooves being provided with gently inclined side walls, a plurality of packing rings arranged in each groove having outer inclined surfaces corresponding to the gently inclined surfaces of said side walls and inner inclined surfaces arranged at a greater angle than said outer inclined surfaces and said side walls, one of said packing rings being provided in its outer face with an annular groove forming rapid wearing and quick seating ribs at opposite sides thereof.

3. A piston having an annular groove provided with gently inclined side walls, and a packing arranged in said groove, said packing comprising a plurality of split resilient rings having outer inclined faces conforming to the gently inclined faces of the side walls and having inclined faces arranged at a greater angle of inclination than said outer inclined faces and said side walls.

4. A piston having an annular groove, said groove having gently inclined side walls, and a packing comprising a plurality of split resilient packing rings arranged in said groove, said rings having gently curved outer surfaces conforming to said side walls and more abruptly inclined inner surfaces for wedging action in coöperation therewith, one of said rings having an annular groove forming rapid wearing and quick seating ribs at opposite sides thereof.

5. A piston having an annular groove provided with gently inclined side walls, and packing rings arranged in said grooves and having abruptly inclined inner surfaces and gently inclined outer surfaces, one of said rings being provided with an oil groove and reduced rapid wearing and seating projections.

6. A piston having an annular groove provided with gently inclined side walls, a pair of side rings seated in said groove and having cooperating gently inclined outer side faces and more abruptly inclined inner faces, and a central ring arranged between said side rings and having inclined side faces conforming to the inner inclined side faces of said side rings, one of said side rings being provided in its outer face with an oil groove and reduced rapid wearing and seating projections at opposite sides thereof.

In testimony whereof I affix my signature.

OSCAR W. HANSON.